(12) United States Patent
Mueller

(10) Patent No.: US 6,299,197 B1
(45) Date of Patent: Oct. 9, 2001

(54) AIRBAG DEVICE VEHICLE INTERIOR LINING FOR COVERING AN AIRBAG DEVICE, SEAT WITH AN AIRBAG DEVICE AND ACTIVATION METHOD OF AN AIRBAG DEVICE

(75) Inventor: Olaf Mueller, Ruesselsheim (DE)

(73) Assignee: INOVA GmbH Technische Entwicklungen, Ruesselsheim (DE)

( * ) Notice: Subject to any disclaimer, the term of this patent is extended or adjusted under 35 U.S.C. 154(b) by 0 days.

(21) Appl. No.: 09/222,774

(22) Filed: Dec. 30, 1998

(30) Foreign Application Priority Data

Dec. 30, 1997 (DE) .......................................... 297 22 976 U
Oct. 14, 1998 (DE) .......................................... 298 18 373 U

(51) Int. Cl.$^7$ .................................................. B60R 21/16
(52) U.S. Cl. ................................... 280/728.3; 280/730.2; 280/743.2
(58) Field of Search ............................. 280/743.2, 728.3, 280/730.2

(56) References Cited

U.S. PATENT DOCUMENTS

| | | | |
|---|---|---|---|
| 5,678,853 | * 10/1997 | Maly | .................................. 280/730.2 |
| 5,762,363 | * 6/1998 | Brown et al. | ...................... 280/730.2 |
| 5,810,389 | * 9/1998 | Yamaji et al. | ..................... 280/730.2 |
| 5,927,749 | * 7/1999 | Homier et al. | ..................... 280/730.2 |
| 5,967,603 | * 10/1999 | Genders et al. | ................... 280/730.2 |
| 6,003,938 | * 12/1999 | Lachat et al. | ...................... 280/730.2 |

* cited by examiner

Primary Examiner—Eric Culbreth
(74) Attorney, Agent, or Firm—Martin Fleit

(57) ABSTRACT

The present invention relates to an air bag system having an air bag and a covering which contains at least one tearing thread in an outlet area of the air bag for opening the covering. The tearing thread is a thread of a woven fabric and/or of a seam of the covering in the outlet area of the air bag. Tearing devices are provided which, in the outlet area of the air bag from the covering, are applied to the at least one tearing thread and are coupled to the air bag system. When the air bag system is triggered, the tearing devices weaken or open up the covering before or during inflation of the air bag by severing the at least one tearing thread. Furthermore, the invention relates to an interior vehicle covering which is suitable as a covering of the air bag system, a seat equipped with such a covering and air bag system, and a triggering process of an air bag system situated under a covering.

14 Claims, 6 Drawing Sheets

AIRBAG DEVICE VEHICLE INTERIOR LINING FOR COVERING AN AIRBAG DEVICE, SEAT WITH AN AIRBAG DEVICE AND ACTIVATION METHOD OF AN AIRBAG DEVICE

BACKGROUND OF THE INVENTION

The present invention relates to an air bag system, to an interior vehicle covering, to a seat, and to a triggering process for an air bag system.

Normally, air bag systems are accommodated behind a covering, such as a dashboard support covering, a door covering, or a seat cover, which tears open when the air bag system is triggered in order to allow an air bag of the air bag system to pass through. For ensuring the safety function of the air bag system, the covering can not significantly hinder the air bag from emerging. Currently, only the force of the inflating air bag is used in practice to rip open the covering along a weakening line, such as a tearing seam or a tearing thread. The strength of the tearing seam, the quality and yield of the material with a high tolerance, and time delay therefore currently affect inflation of an air bag accommodated in such a manner, such as a thorax air bag, out of a seat backrest. Such weakening lines, however, cannot be constructed to be arbitrarily weak, since it is necessary to prevent the covering, such as a seat cover, from opening up there during normal use according to its purpose. Considerable portions of the force of the inflating air bag and the time must therefore be used for opening the covering; this counteracts the provision of the protective function.

Thorax air bags protecting against lateral impacts, for example, are frequently accommodated in seat backrests in the vehicle under covering fabrics in an invisible manner. In order to emerge in the event of a crash, such an air bag destroys the sewn seam at the edge of the seat. A correspondingly high force is required for this purpose. If the seat covers have a low stretching capacity (such as linen), then the air bag still inflates fast in comparison to stretchable coverings, but when considered in an absolute sense, nevertheless with a considerable time delay. With a stretchable covering (such as stretch fabrics or a velour fabric), the air bag first inflates the covering and, in this process, additionally loses force. Time delays of 50% are conceivable. In order to prevent this, "collars" made of a material with a low stretching capacity are sometimes placed around the air bag module and sewn into the seams of the seat cover. High expenditures and a still increased opening force of the seam are required.

SUMMARY OF THE INVENTION

It is an object of the present invention to improve the inflation behavior of an air bag of an air bag system which is accommodated behind a vehicle interior covering.

This object is achieved by a particularly claimed air bag system, a particularly claimed interior vehicle covering, a particularly claimed seat and a particularly claimed air bag system triggering process.

The invention provides an air bag system which has an air bag and a covering which contains at least one tearing thread or string in an outlet area of the air bag for opening the covering. This string is a thread of a woven fabric and/or of a seam of the covering in the outlet area of the air bag. According to the invention, tearing devices are also provided which are applied in the outlet area of the air bag from the covering to the at least one tearing thread. The tearing devices are coupled to the air bag system such that, when the air bag system is triggered, they weaken or open the covering before or during inflation of the air bag by severing the at least one tearing thread.

The tearing devices, therefore, keep the tearing thread from being severed by the air bag directly, and particularly before the contact with the inflating air bag, so that the covering is already opened up or at least weakened further when the inflating air bag presses against it from the inside. Therefore, the air bag does not require as much force and time for passing through or emerging from the covering as with a covering with defined weakening lines as is known from practice. In other words, according to the invention, weakening lines or opening lines are generated only as required, for example, according to what is referred to as the "run" principle. Although this does not mean that weakening lines cannot be provided from the beginning, as a result of the invention, a more extensive weakening or opening along these lines is achieved specifically when required.

The invention therefore utilizes the fact that woven fabrics or seams weakened by "runs" can be opened up by very light force.

Advantages, in addition to a high inflating speed, include a lower inflating tolerance and lower air bag system costs.

According to a preferred further development of the invention, the tearing thread can be opened up by energy reduced by 1:5 by the inflating of an air bag, such as a thorax air bag, since the tearing thread is correspondingly weakened by the tearing devices.

The covering preferably is a seat cover of a seat bottom part and/or of a seat backrest, a headrest covering, a headrest cheek covering, a dashboard covering, a door covering, a roof ceiling or another interior vehicle covering.

In a particularly preferred embodiment of the invention, the tearing devices contain severing devices which are applied to the at least one tearing thread of the covering and are coupled to the air bag system such that, when the air bag system is triggered, they weaken or open up the covering before or during the inflating of the air bag by severing the at least one tearing thread. The severing devices preferably contain a severing thread, a severing string or a severing wire by which the at least one tearing thread can be severed at at least one point. As an alternative or in addition, the severing devices can be sewn in the outlet area of the air bag from the covering into the woven fabric and/or seam of the covering in addition to the at least one tearing thread.

Another preferred embodiment of the invention has an air bag system which contains at least one part which can be moved when the air bag system is triggered or which can be moved itself when it is triggered, and in which the tearing devices or, optionally, the severing devices are coupled to the movable part of the air bag system or the movable air bag system in order to sever the at least one tearing thread of the covering by the movement of the part or of the air bag system.

The above-mentioned embodiment can be further developed by providing the air bag system with an air bag module housing with a lid as the movable part and in which the lid opens up when the air bag system is triggered. By way of the opening movement, the lid cuts the at least one tearing thread of the covering with the tearing devices or, optionally, the severing devices.

Another further development of the air bag system which can be moved itself or of the air bag system with the movable part, which can also be used in addition to the above-mentioned variant, is that coupling of the tearing devices, or optionally of the severing devices, to the air bag system is ensured by the permanent direct connection or engagement, when triggered, with the movable part, optionally the lid, or with the air bag system which can be moved itself.

Preferred implementations of the air bag system according to the invention are a thorax air bag in a seat backrest and/or in a seat bottom part, a head air bag in a headrest, a frontal air bag in a dashboard, a side air bag in a vehicle door, in a vehicle side part or in a seat headrest cheek and/or a roof air bag at a vehicle roof.

The object of the invention is also achieved by an interior vehicle covering for covering an air bag system having at least one tearing thread in an outlet area of an air bag of the air bag system. Also, according to the invention, for the at least one tearing thread, severing devices are sewn in which either are coupled to the air bag system or can be coupled to the air bag system. When the air bag system is triggered, the at least one tearing thread of the covering can be severed by the severing devices for weakening or opening up the thread.

A preferred further development thereof is that the severing devices contain a severing thread, a severing string or a severing wire by which the at least one tearing thread can be severed at at least one point. As an alternative or in addition, the interior vehicle covering may be a seat cover of a seat bottom part and/or of a seat backrest, a headrest covering, a seat headrest cheek covering, a dashboard covering, a door covering or a roof ceiling.

Furthermore, the object of the invention is also achieved by a seat having an air bag system and a seat cover as described above.

Finally, the object of the invention is also achieved by a triggering process for an air bag system under a covering which, when the air bag system is triggered, is opened up in an outlet area of the air bag by tearing at least one tearing thread of a woven fabric and/or a seam of the covering in the outlet area of the air bag. Before or during inflation of the air bag, tearing devices act upon the at least one tearing thread such that, when the air bag system is triggered, they weaken or open up the at least one tearing thread at at least one point and therefore weaken or open up the covering before or during inflation of the air bag.

A further development of this process within the scope of the invention is that the severing of the at least one tearing thread leads to a run-type weakening or opening-up of the covering in the outlet area of the air bag.

Additional preferred and advantageous further developments of the invention are claimed.

Particular embodiments which contain combinations of the characteristics mentioned are referred to in the following.

The covering, such as the covering of a motor vehicle seat, is prepared for an outlet opening for an air bag, such as a thorax air bag. This outlet opening which, in particular, may be situated at the edge of a covering surface, is closed by a tearing seam or a tearing thread, which may be provided instead of a normal covering seam, as long as the air bag is not triggered.

Such a tearing seam normally consists of an upper thread and a lower thread. According to the invention, in this type of an embodiment, at least one severing thread of a higher strength is sewn in with one of these two threads (upper or lower thread). A linking of the severing thread or threads, for example, to each fifth seam loop reduces the tearing-open force as a result of the run effect to 1:5.

BRIEF DESCRIPTION OF THE DRAWINGS

The invention will be now explained in detail with reference to embodiments shown in the drawings.

DESCRIPTION OF THE PREFERRED EMBODIMENTS

In all figures of the drawings, identical and similar parts or parts which operate in identical and similar manners all have the same reference numbers. The figures clearly show additional characteristics of the illustrated embodiments, even if these characteristics are not discussed separately in the following description.

Figure 1:
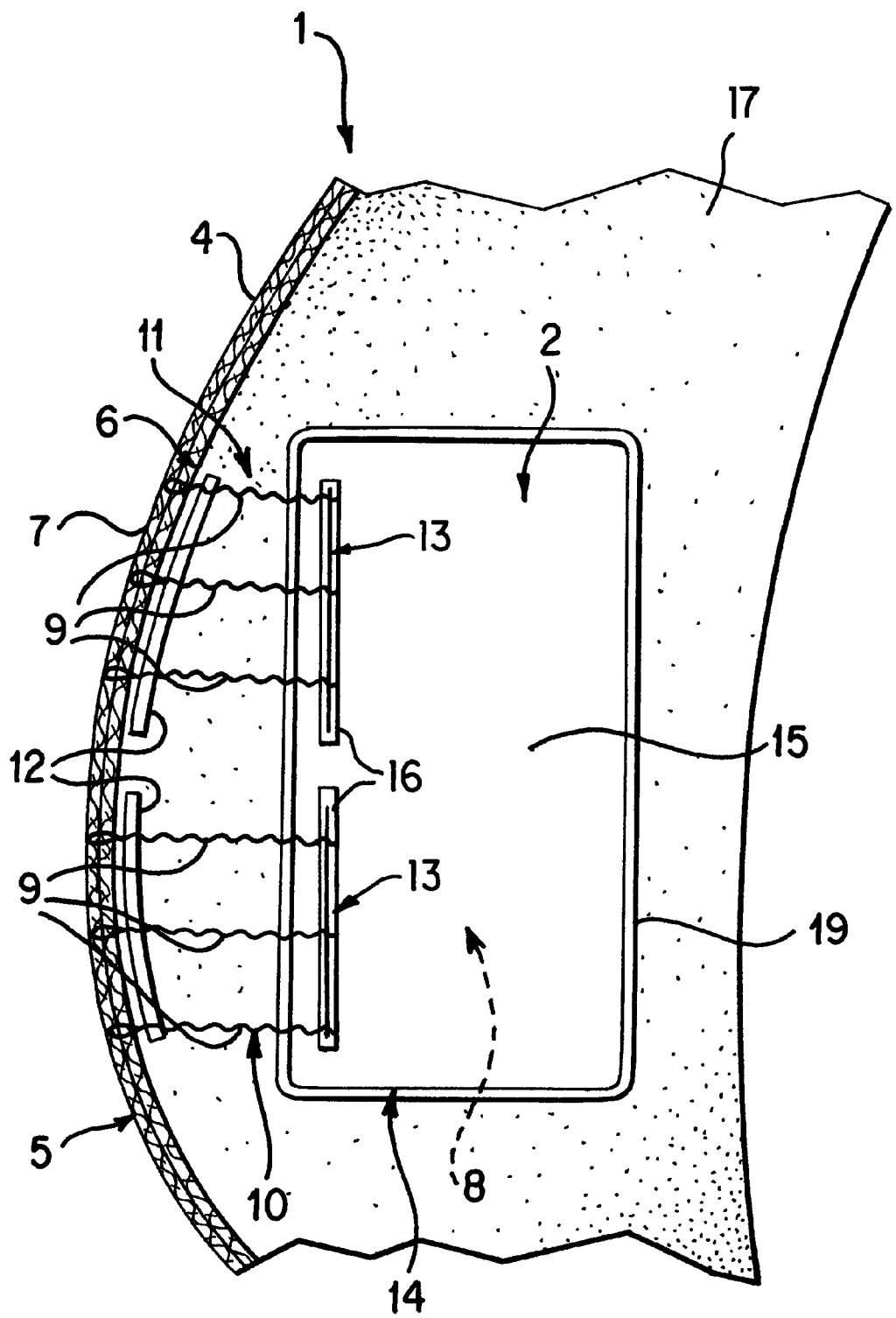
FIG. 1 is a partial lateral sectional view of a seat backrest with an integrated air bag system as a first embodiment of the invention.

FIG. 1 is a vertically cut, partially lateral view of a seat backrest 1 with an air bag system 2 in the form of an air bag module 3 under a cover 4 used as the covering 5 in the first embodiment.

In the sectional plane of FIG. 1, the cover 4 has a seam 6 which contains a tearing thread 7, which tears when the air bag system 2 is triggered so that an air bag 8 (shown in FIG. 2) contained in the air bag module 3 can emerge and be inflated into its protective position. In the illustrated embodiment, severing threads 9 which extend approximately at a right angle are sewn in with the tearing thread 7, specifically such that a severing thread 9 is linked to each fifth loop of the tearing thread or tearing seam 7. The severing threads 9, which generally are severing devices 10 for the tearing thread 7, are part of tearing devices 11.

In the embodiment illustrated in FIG. 1, the tearing devices 11 also contain a spacing strip 12, which is divided into two halves, and a hooking-in device 13 which is described in greater detail below. During sewing, the spacing strip 12 indicates the correct spacing of the severing threads 9. The spacing strip 12 can simultaneously operate as a tearing element and may optionally be additionally sharpened in the tearing direction.

Figure 2:
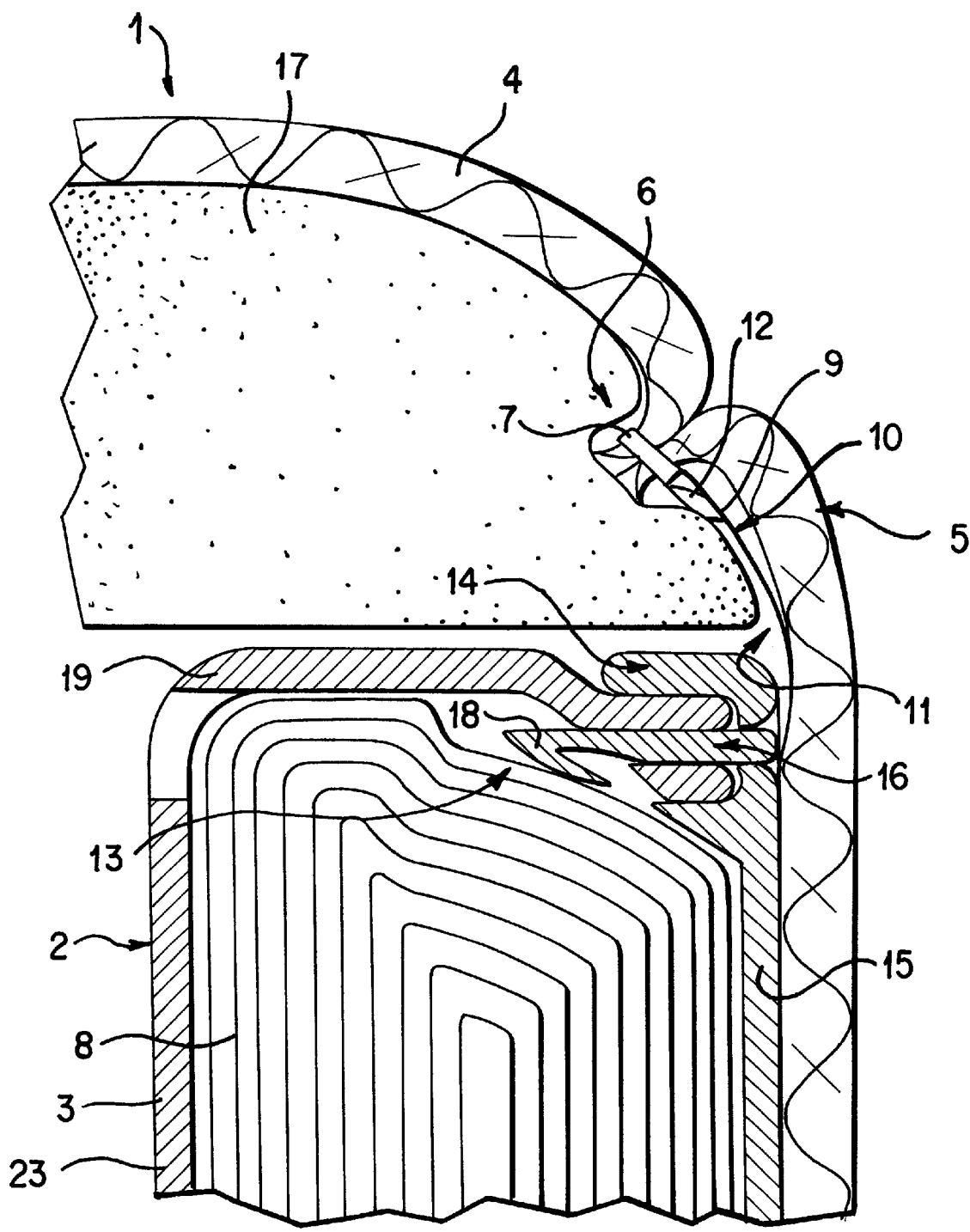
FIG. 2 is a horizontal cross-sectional view of an edge area of a seat backrest with an air bag system of the first embodiment of FIG. 1.

The air bag module 3 contains a lid 15 as a movable part 14 which is provided with slots 16 into which the hooking-in device 13 of the severing threads 9 is inserted, as better illustrated in FIG. 2.

FIG. 2 is a horizontal cross-sectional view of an edge area of a seat backrest 1. The seat cover 4 is stretched over foam material 17 and the air bag module 3 and is provided with the tearing seam 6. The severing threads 9 are combined in the hooking-in device 13 which is formed by one or several hooks 18. The hooking-in device 13 is fitted through a slot 16 in the lid 15. The air bag module 3 also has a module housing 19, which is closed by the lid 15 as long as the air bag system 2 is not triggered, and on which the hooking-in device 13 is hooked in.

Figure 3:
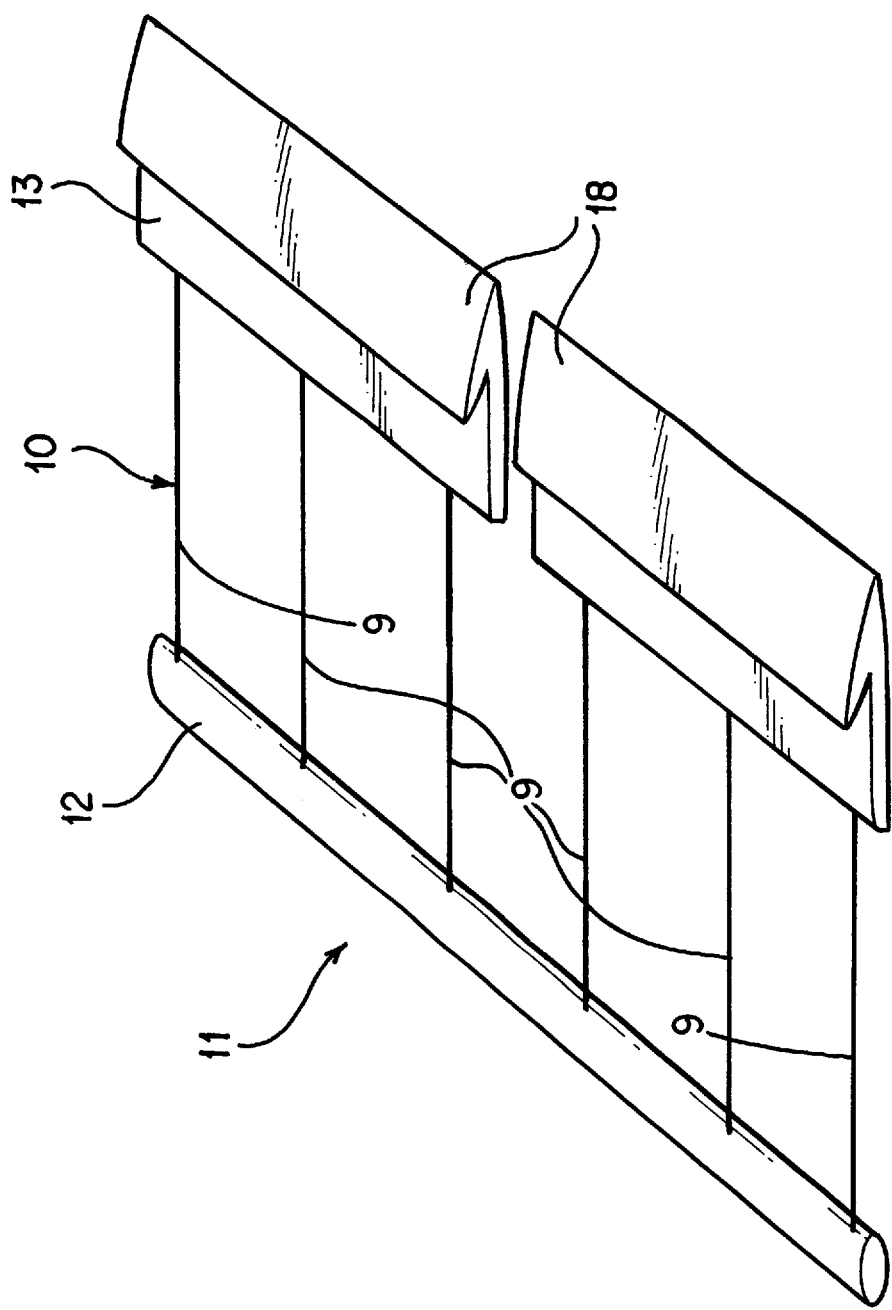
FIG. 3 is a perspective view of an embodiment of tearing devices for use with an air bag system in the construction according to FIGS. 1 and 2.

FIG. 3 shows that the severing threads 9 are sprayed in or otherwise connected with the spacing strip 12 and the hooking-in device 13. The number of the threads and their spacing can easily be optimized in tests for concrete applications. The severing threads 9 are sewn in the seam area to be opened up, that is, the outlet area of the air bag 8, at defined distances, for example, each fifth to tenth loop, together with the tearing thread 7 and are stronger than the latter. The severing threads 9 are fastened in the hooks 18, which may be plastic hooks, are fitted through the air bag module lid 15, and are hooked together with the air bag module housing 19.

If the air bag module lid 15 opens up during a crash-caused triggering of the air bag system 2, then the severing threads 9 together with the spacing strip 12 divided into two parts must be pulled through the slots 16. As a result, the lid 15 of the air bag module 3 pulls, by way of the inflating air bag 8, on the severing threads 9 which are fixed on the module housing 19 by the hooking-in device 13. This causes the severing threads 9 to start tearing at the tearing thread 7 and sever the latter. The thus achieved weakening of the tearing thread 7 allows the air bag 8 to emerge from the cover 4 without high force and loss of time and to open up the possibly remaining portions of the tearing seam 7. The severing threads 9 together with the spacer strip 12 can easily be pulled through the slots 16 of the opening lid 15. The initial tearing on the severing threads 9 during the triggering of the air bag system 2 can be promoted by the recoil of the module housing 19 of the air bag module 3 during the explosion-type inflating of the air bag 8 with respect to the lid 15. The air bag 8 can open up with a significantly lower force and therefore faster and independently of the elasticity of the fabric of the tearing seam 7. The severing threads 9 tear "runs" into the tearing seam 7.

Instead of a spacing strip 12 divided into two parts corresponding to the slots 16, a one-piece spacing strip can also be used for which a matching slot is then provided in the lid.

Figure 4:
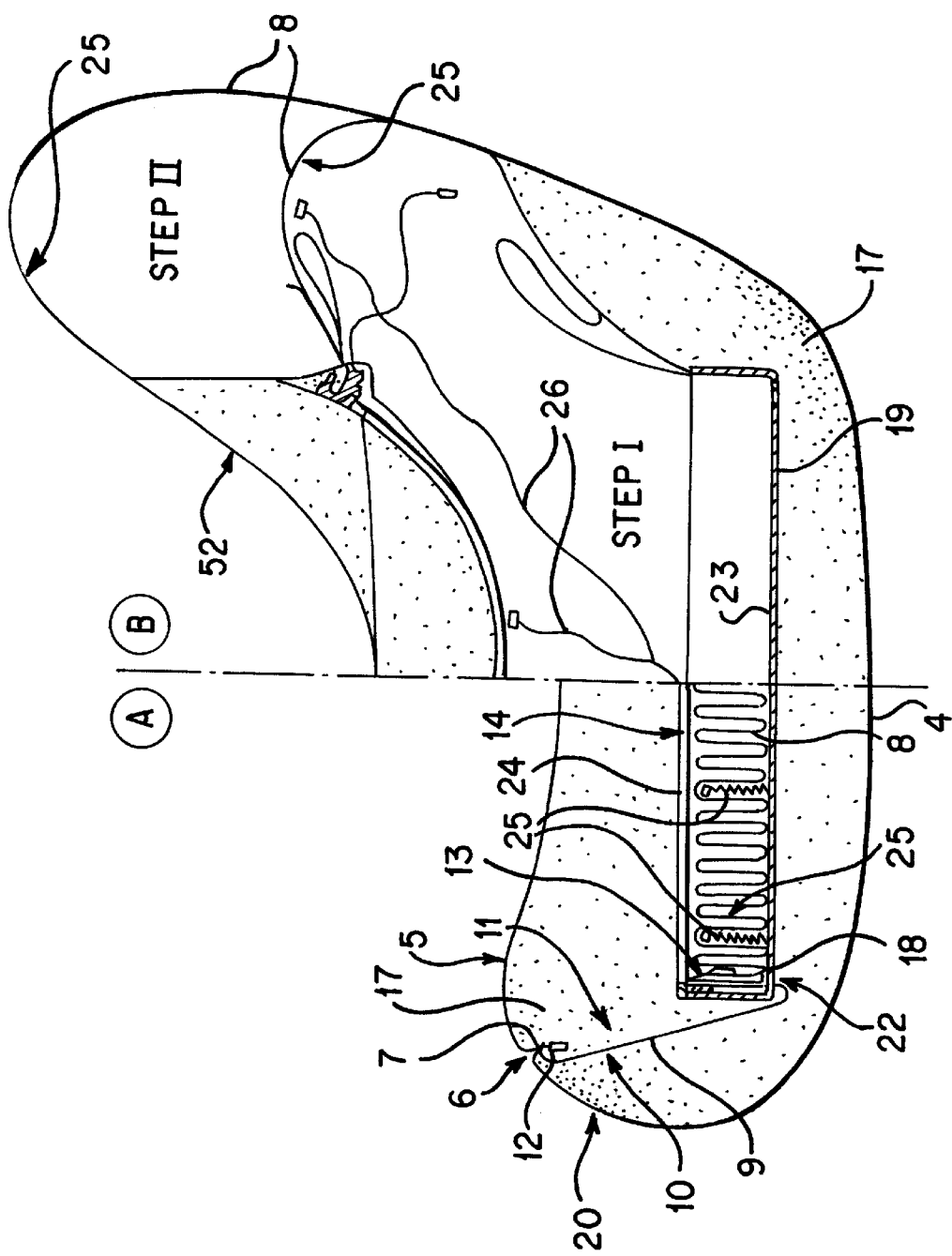
FIG. 4 is a view of a second embodiment of the invention in the form of a headrest with an integrated air bag system, specifically in Part A in an untriggered condition and in Part B in a partially triggered and in a completely triggered condition.
Figure 5:
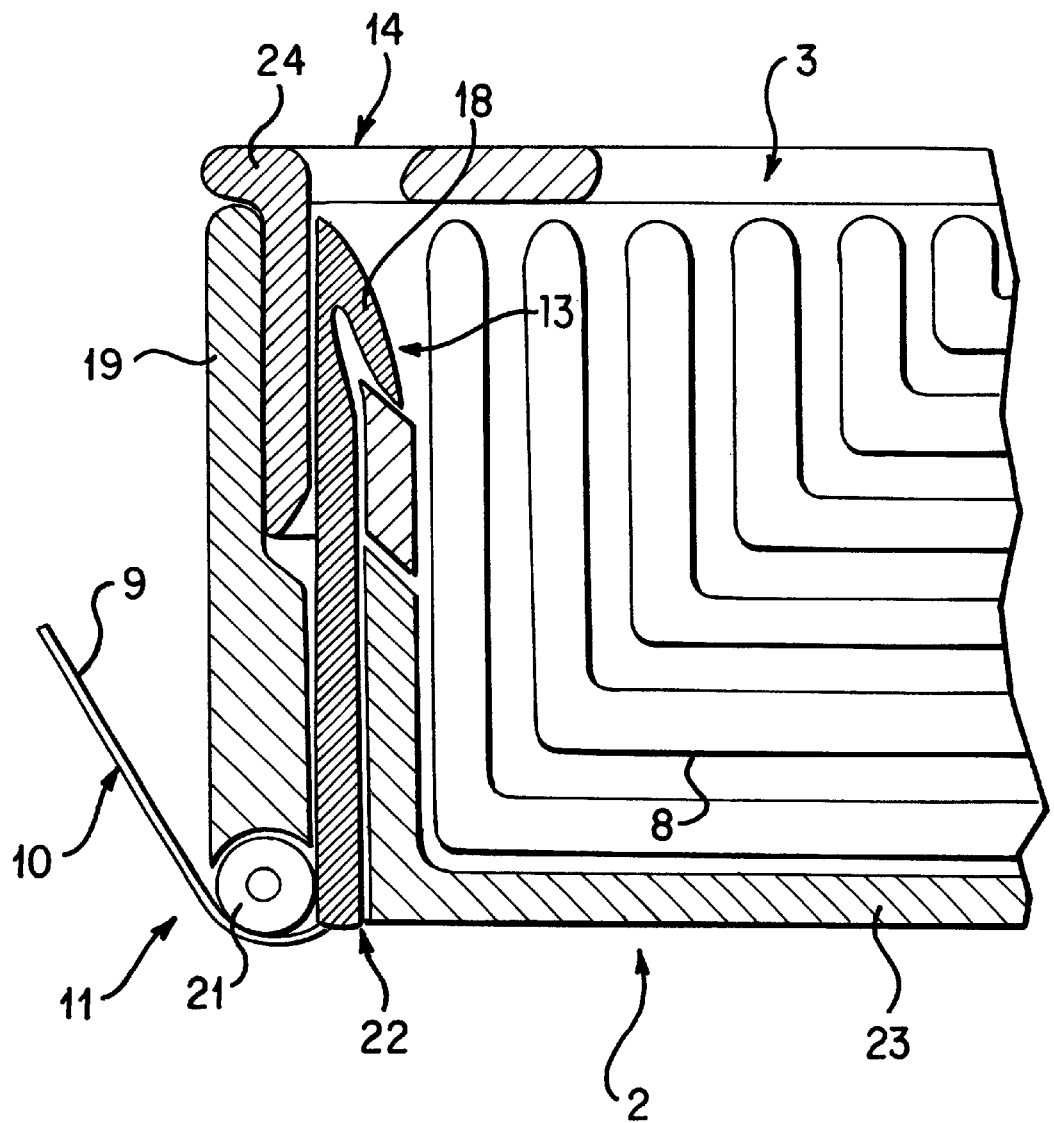
FIG. 5 is a partial cross-sectional view particularly of the coupling of the tearing devices and the air bag module in the second embodiment according to FIG. 4.

FIGS. 4 and 5 show the use of the invention in an air bag system 2 integrated in a headrest 20.

Before this embodiment is explained in detail, some characteristics of the headrest air bag will first be pointed out.

For reasons of comfort, headrests are arranged at a distance of approximately 70 mm from the head. On the other hand, because of the therefore excessive distance, headrests are only insufficiently suitable for supporting the head in the event of a rearward crash. Tests have demonstrated that a small air bag which, when the head is in the correct position, fills the space between the headrest and the head, represents an important remedy in this case. When the head is out of position, that is, for example, when it rests against the headrest during the accident, measures are required to provide a less aggressive construction of the air bag. Furthermore, a larger air bag, which surrounds the head, is naturally advantageous.

Corresponding to the invention, the air bag is capable of emerging from the headrest in a much less aggressive manner in that, compared with the situation in which the air bag itself would have to apply the force for opening the tearing seam, according to the principle described above, which may be called a run principle, the air bag opens up the tearing seam early with a low force even if an actual run effect does not occur in every embodiment.

As an additional step, it is possible to check the position of the air bag by way of threads sewn to the interior surface of the air bag and to ignite a second ignition stage by way of their tearing-off. This second ignition stage can be carried out only when the first stage has pressed the head "in position". With respect to further details and characteristics of multistage controlling of the inflating operation of an air bag in order to avoid "out-of-position" situations, in other words, of a "soft air bag", reference is made to German Patent Applications 196 41 224.2, 197 03 945.6, 197 09 257.8, 197 15 463.8, 197 38 727.6 and 198 44 413.3, U.S. patent application Ser. No. 09/017,858 as well as German Utility Model Applications 297 17 250.6 and 298 20 722.2, which originate from the present applicant and whose complete contents are incorporated in the present documents by reference in order to avoid repetitions.

In the horizontal cross-sectional view of FIG. 4, part A on the left-hand side of the figure shows the at rest condition of the air bag system 2, and part B on the right-hand side of the figure shows, as "Step I", the partial opening of the air bag 8 by means of a first non-aggressive air bag stage and, as "Step II", the complete opening of the air bag 8 by means of a second air bag stage after the triggering of the air bag system 2.

FIG. 5 shows the suspension and guidance of the severing threads 9 analogous to FIG. 2 in a sectional partially detailed view.

FIGS. 4 and 5 show the headrest 20 with the cover 4 stretched around the foam material, the tearing seam 7, the severing threads 9 which in this case are guided by a deflecting roller or a deflecting pin 21 (for the purpose of clarity, shown only in FIG. 5) through a hole 22 in the module housing bottom 23. The threads are fastened by hooks 18 in a frame 24 situated on the air bag 8, which frame represents a movable part 14 of the air bag system 2. The severing threads 9 extend through the foam material 17 and, for better sliding, are provided throughout with a sliding or separating medium.

As particularly clearly shown in part B of FIG. 4, sensor threads 26 are sewn to the interior surface 25 of the air bag 8. These sensor threads 26 tear off when, unhindered by an occupant's head, the air bag 8 reaches or exceeds the inflated condition of "Step I". By the tearing-off of the sensor threads 26, a second stage of the air bag system 2 is ignited and the air bag 8 is therefore inflated to its full size, as illustrated in "Step II".

Additional applications are conceivable and useful in the whole air bag technology field if the air bag is accommodated under a cover with a seam or a woven fabric.

As mentioned above, a recoil movement of the whole air bag system can also be used for mechanically operating the tearing devices. Alternatives are, for example, a linking of the severing threads or generally of the cutting devices to the air bag or to a movable cartridge or to a pressure pan surrounding the latter. Separate operating devices for the tearing devices can also be provided.

In an alternative for further reducing the tearing-open force, metal wires are used as the severing devices and have ends connected with the tearing thread which are preferably constructed to be cutting and particularly to be cutting all around. A cutting wire may also be provided as the severing device which is operated, for example, by way of a wire pull, and which is constructed at least on its end with a sharp edge or to be cutting all around. Such a cutting wire preferably has several sharp edges or constructions along its length which cut all around and which can be covered in a ready position, thus before the triggering of the air bag system, in order to avoid an accidental cutting of the tearing thread.

Instead of the mechanical operation of the severing devices, for example, by severing threads, severing strings or severing wires, the severing devices may, for example, also contain an electrically ignitable fuse which is proportioned and arranged such that it at least partially severs or destroys only the tearing thread and represents no risk of injury to occupants. In combination with suitable materials of the tearing thread, heating of a severing wire can also be utilized for severing the tearing thread as desired according to the invention.

The severing threads may also have different lengths or, if the lengths are the same, may have to bridge differing distances between the air bag system and the tearing thread. As a result, the tearing-open load can be distributed in a load-reducing manner along the length of the opening to be made available for the air bag in its outlet area. Severing threads of different lengths or severing thread operating paths of different lengths are created, for example, by the rounding of the seat. If the severing threads in the center of the outlet area are shorter or are tensioned earlier than those at the edge of the outlet area, then a targeted central emerging of the air bag is ensured.

Without limitation, the coupling of the tearing devices to the air bag system within the scope of the invention also comprises the control-related coupling by way of, for example, belt tightening devices, which are triggered simultaneously with the air bag system and to whose mechanical movement the tearing devices are connected. By such a construction, the tearing thread can also be weakened completely without the effect of the inflating air bag of the air bag system, its own movement and/or the movement of a part of the air bag system. Generally, according to the invention, any parts or components which are mechanically movable when triggering the air bag are suitable for operating the tearing devices if the controlling of these parts or components can take place by way of the triggering of the air bag system. The corresponding suitable linking of the tearing devices to such parts or components can easily be achieved by a person skilled in the field of safety technology in the knowledge of the present invention and of the disclosure content of documents within the scope of his technical knowhow optionally while including suitable prior art.

Further details concerning the design possibilities of the invention are found in the figures of the drawing.

To the extent that the invention is explained in these documents by way of the example of thorax air bags or head air bags, this takes place only for purposes of an explanation and in the manner of examples. The invention is not limited to a use involving thorax air bags or head air bags but can be applied to any air bag which, before its triggering, is accommodated behind a covering with a tearing thread, in which case the invention is also not limited to applications in motor vehicles.

Figure 6:
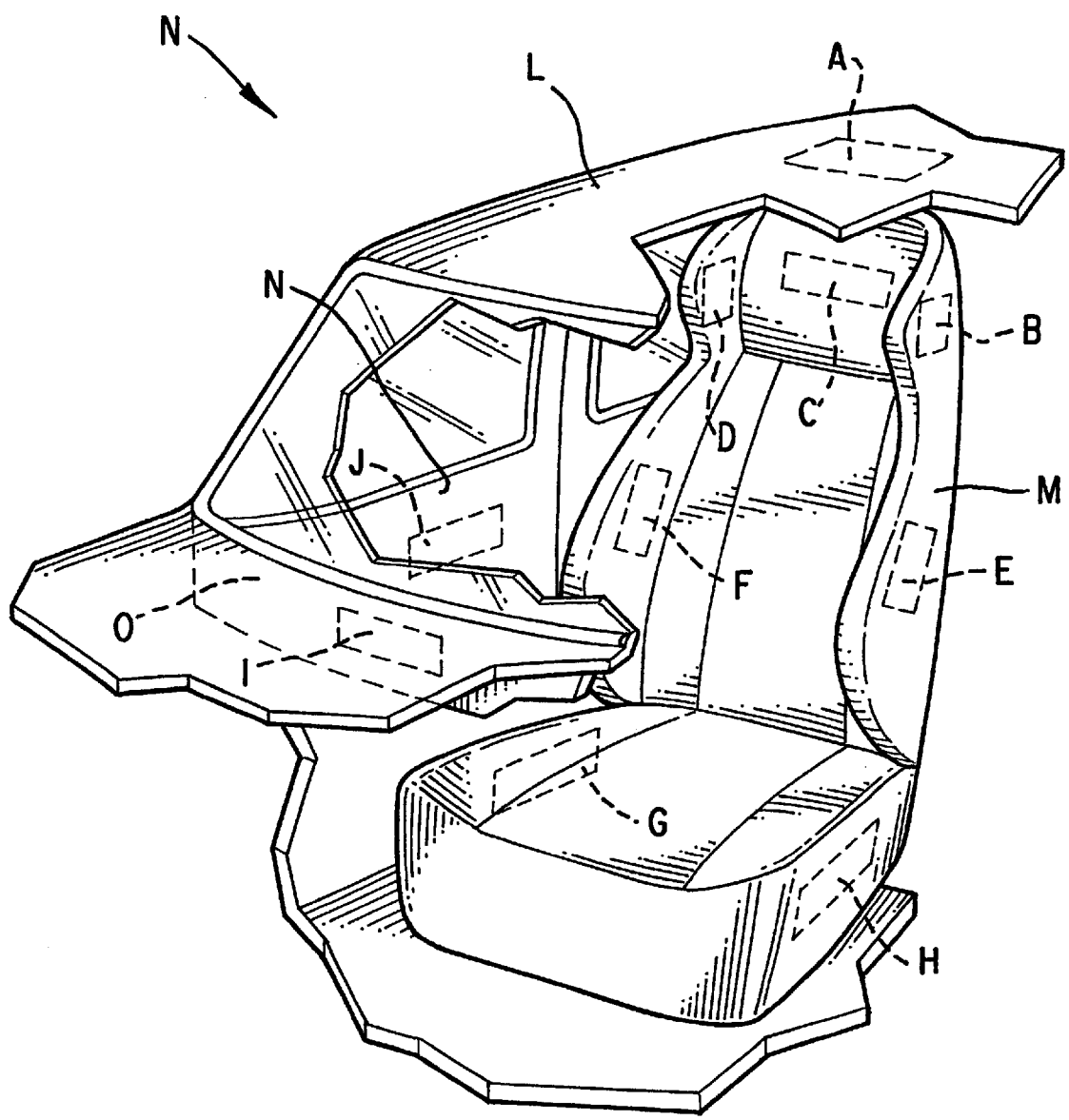
FIG. 6 is a schematic view of a vehicle, partly broken away showing the parts of the vehicle.

FIG. 6 schematically shows the possible locations of the air bag behind woven fabric coverings in a vehicle. Such locations include the woven fabric covering being part of any of a seat cover of a seat bottom part G or H, a seat cover of a seat backrest E, F or M, a headrest covering C or D, a headrest cheek covering B or D, a dashboard covering O or I, a door covering N, a roof ceiling A or L, and door N or J. The air bag may be any of a thorax air bag in a seat backrest C–F or M, a thorax air bag in a seat bottom part G or H, a head air bag in a headrest B–D, a frontal air bag in a dashboard O or I, a side air bag in a vehicle door J or N, a side air bag in a vehicle side part J or N, a side air bag in a seat headrest cheek B or D and a roof air bag at a vehicle roof A or L.

For achieving the object of a further safety increase, for example, for motor vehicle occupants, it is suggested by the present invention to further develop a tearing seam of a covering, behind which an air bag is accommodated before its triggering, by additional devices such that it can be opened up by the inflating air bag at least with reduced energy. In particular, in the case of the invention, the principle of the run is used for opening up the tearing seam of the covering.

In addition to the characteristics and combinations of characteristics described above, shown in the drawings and defined by the claims, the present invention, without limitation, comprises all concepts, principles and generalizations which the person skilled in the art can easily recognize on the basis of his special knowledge in the present field. In particular, all variations, modifications and substitutions on the basis of the technical knowledge of a person skilled in the art are within the scope of the invention.

What is claimed is:

1. Air bag system comprising:
    an air bag,
    a movable part of the air bag system,
    a covering which contains at least one tearing thread in an outlet area of the air bag for opening the covering, said tearing thread being at least the thread of one of a woven fabric and a seam of the covering in the outlet area of the air bag,
    a tearing device including a plurality of severing devices, said severing devices, in the outlet area of the air bag for opening the covering, engaging with the at least one tearing thread at spaced locations,
    said tearing device being coupled to the movable part of the air bag system so that, when the air bag system is triggered, the movable part moves, in response thereto, pulling the tearing device and the severing devices to sever the at least one tearing thread at spaced locations to weaken and facilitate opening up of the covering during inflation of the air bag.

2. Air bag system according to claim 1, wherein the covering is any of a seat cover of a seat bottom part, a seat cover of a seat backrest, a headrest covering, a headrest cheek covering, a dashboard covering, a door covering, and a roof ceiling.

3. Air bag system according to claim 1, wherein a plurality of tearing devices are provided, each containing severing devices which are engaged with the at least one tearing thread of the covering.

4. Air bag system according to claim 1, wherein the severing devices comprise any of a severing thread, a severing string or a severing wire.

5. Air bag system according to claim 4, wherein the severing devices, in the outlet area of the air bag from the covering, are sewn in with the at least one tearing thread.

6. Air bag system according to claim 1, wherein a lid of an air bag module housing constitutes said movable part.

7. Air bag system according to claim 1, wherein the coupling of the tearing device to the movable part of the air bag system is ensured by a direct engagement.

8. Air bag system according to claim 1, wherein the air bag is any of a thorax air bag in a seat backrest, a thorax air bag in a seat bottom part, a head air bag in a headrest, a frontal air bag in a dashboard, a side air bag in a vehicle door, a side air bag in a vehicle side part, a side air bag in a seat headrest cheek and a roof air bag at a vehicle roof.

9. Interior vehicle covering for covering an air bag system including a movable part that moves in response to triggering of the air bag system, comprising:

at least one tearing thread in an outlet area of an air bag of the air bag system, a plurality of severing devices sewn together at spaced locations with the at least one tearing thread, said severing devices being coupled to the movable part of the air bag system so that, in response to triggering of the air bag system, the movable part pulls the severing devices to sever the at least one tearing thread at a plurality of locations to weaken and facilitate opening up of the covering during inflation of the air bag.

10. Interior vehicle covering according to claim 9, wherein the severing devices comprise any of a severing thread, a severing string or a severing wire.

11. Interior vehicle covering according to claim 9, wherein the covering is any of a seat cover of a seat bottom part, a seat cover of a seat backrest, a headrest covering, a headrest cheek covering, a dashboard covering, a door covering and a roof ceiling.

12. Seat having an air bag system, comprising one of a seat covering and a headrest covering according to claim 9.

13. Triggering process of an air bag system including a movable part and an inflatable air bag under a covering comprising the steps of:

providing at least one tearing thread in the covering, the at least one tearing thread being a thread of one of a woven fabric and a seam of the covering in an outlet area of the air bag, triggering the air bag system to cause movement of the movable part and inflation of the air bag, and positively severing, in response to triggering of the air bag, the at least one tearing thread at a plurality of spaced locations with a tearing device coupled to the movable part, said tearing device including a plurality of severing devices that engage the at least one tearing thread at the plurality of spaced locations and effect severing when moved with the movable part thereby to weaken and facilitate opening of the covering during inflation of the air bag.

14. Triggering process according to claim 13, wherein severing of the at least one tearing thread in a plurality of locations leads to a run weakening of the covering in the outlet area of the air bag.

\* \* \* \* \*